(12) United States Patent
Greenwood et al.

(10) Patent No.: US 10,254,120 B2
(45) Date of Patent: Apr. 9, 2019

(54) API FOR OBTAINING GEOGRAPHIC LOCATION DATA

(71) Applicant: Google Inc., Mountain View, CA (US)

(72) Inventors: Benjamin Greenwood, Rozelle (AU); Joseph Laurence Scarr, Camperdown (AU)

(73) Assignee: Google LLC, Mountain View, CA (US)

( * ) Notice: Subject to any disclaimer, the term of this patent is extended or adjusted under 35 U.S.C. 154(b) by 56 days.

(21) Appl. No.: 15/290,903

(22) Filed: Oct. 11, 2016

(65) Prior Publication Data

US 2018/0100742 A1    Apr. 12, 2018

(51) Int. Cl.
*G01C 21/30* (2006.01)
*G01C 21/36* (2006.01)
*G06F 9/54* (2006.01)
*G06F 17/30* (2006.01)

(52) U.S. Cl.
CPC ......... *G01C 21/30* (2013.01); *G01C 21/3626* (2013.01); *G01C 21/3682* (2013.01); *G01C 21/3694* (2013.01); *G06F 9/541* (2013.01); *G06F 17/30241* (2013.01); *G06F 17/30876* (2013.01)

(58) Field of Classification Search
None
See application file for complete search history.

(56) References Cited

U.S. PATENT DOCUMENTS

| | | | |
|---|---|---|---|
| 8,311,741 B1 | 11/2012 | Lawther et al. | |
| 8,683,050 B2* | 3/2014 | Ickman | G06F 9/541 709/203 |
| 9,234,763 B1 | 1/2016 | Savvopoulos et al. | |
| 9,318,108 B2* | 4/2016 | Gruber | G10L 15/1815 |
| 2008/0134049 A1* | 6/2008 | Gupta | G06F 9/4843 715/738 |
| 2011/0087839 A1 | 4/2011 | Sharma et al. | |
| 2011/0197200 A1 | 8/2011 | Huang et al. | |
| 2012/0204089 A1* | 8/2012 | Boudreau | G01C 21/20 715/205 |

(Continued)

OTHER PUBLICATIONS

International Search Report for PCT/U2017/051491 dated Nov. 8, 2017, 11 pages.

(Continued)

*Primary Examiner* — Tamara L Weber
(74) *Attorney, Agent, or Firm* — Dority & Manning, P.A.

(57) ABSTRACT

Provided are systems and methods for obtaining geographic location data. In one embodiment, an example method includes identifying, by the first software application running on one or more computing devices, one or more location parameters indicative of a geographic point of interest based at least in part on an application programming interface invoked by the first software application. The method includes generating, by the first software application running on the one or more computing devices, a query string including the one or more location parameters. The method includes requesting, by the first software application running on the one or more computing devices, location data associated with the geographic point of interest based at least in part on the query string. The method includes providing for display, on at least one display device, the location data associated with the geographic point of interest.

15 Claims, 8 Drawing Sheets

(56) References Cited

U.S. PATENT DOCUMENTS

| | | | |
|---|---|---|---|
| 2014/0074895 A1* | 3/2014 | Ingerman | G01C 21/00 707/803 |
| 2014/0094194 A1 | 4/2014 | Schwent et al. | |
| 2014/0222950 A1 | 8/2014 | Rabel | |
| 2017/0310770 A1 | 10/2017 | Samaan et al. | |

OTHER PUBLICATIONS

International Search Report for PCT/US2017/055861 dated Dec. 6, 2017, 12 pages.
Anonymous, "Four REST API Versioning Strategies xMatters", Aug. 25, 2016, https://www.xmatters.com/integrations/blog-four-rest-api-versioning-strategies/, retrieved on Aug. 14, 2018, 8 pages.
Anonymous, "List of Geocoding Systems—Wikipedia", Jul. 5, 2016, https://en.wikipedia.org/w/index.php?title=List_of_geocoding_systems&oldid+728474780, retrieved on Aug. 14, 2018, 3 pages.
Goldberg et al., "An Evaluation Framework for Comparing Geocoding Systems", International Journal of Health Geographics, vol. 12, No. 1, Nov. 8, 2013, 15 pages.
Written Opinion of the International Preliminary Examining Authority for PCT/US2017/051491, dated Aug. 21, 2018, 7 pages.
Written Opinion of the International Preliminary Examining Authority for PCT/US2017/055861, dated Aug. 21, 2018, 8 pages.

* cited by examiner

API FOR OBTAINING GEOGRAPHIC LOCATION DATA

FIELD

The present disclosure relates generally to application programming interfaces for a software application implemented on a user computing device to obtain information associated with a geographic point of interest.

BACKGROUND

Applications implemented on computing devices, such as mobile computing devices (e.g., smartphones, tablets, smart watches, etc.) have been developed for a variety of purposes, including business, social, health, and other purposes. These applications can provide a user interface (e.g., a graphical user interface) for presenting information to a user as well as allowing the user to interact with the application. Popular applications for mobile computing devices include map applications that make varied geographic information (e.g., current location information presented on a map) available to users.

Application programming interfaces can allow applications implemented on computing devices to interact with various services to provide information and functionality to a user. Application programming interfaces can provide a tool for developers to easily embed information, programming, services, frameworks, and structures into applications for access by the user.

In some cases, however, applications can have difficulty communicating with one another to request and/or retrieve desired data. Such an issue can arise when the separate applications are associated with different, heterogeneous data sets. For example, applications which are "place-centric" (e.g., travel, local search, social/events) frequently need to communicate with mapping applications in order to provide additional functionality (such as providing driving navigation). The places data used by the "place-centric app" is often not the same as the places data used by the mapping product. For example, a hotel finder application might know of "Grandma's Bed and Breakfast," but when it communicates with a mapping application, there is no guarantee that the mapping application has data for the existence of that place.

Many applications today use latitude-longitude coordinates as "stable identifiers" to link from one application to another. However, latitude-longitude coordinates are often a "lossy transformation" (e.g., much less information is known about a latitude-longitude than is known about a specific place). In such a case, the mapping application may provide a less optimal user experience as a result (e.g. not routing to the correct entry point for a place, miscalculating ETA, not providing a good arrival experience).

SUMMARY

Aspects and advantages of embodiments of the present disclosure will be set forth in part in the following description, or may be learned from the description, or may be learned through practice of the embodiments.

One example aspect of the present disclosure is directed to a non-transitory computer-readable medium storing computer-readable instructions that implement an application programming interface for obtaining geographic location data executed on one or more computing devices. The one or more computing devices have one or more processors and at least one display device. The application programming interface includes instructions for identifying, by a first software application associated with the one or more computing devices, one or more location parameters indicative of a geographic point of interest. The application programming interface includes instructions for generating, by the first software application, a query string that includes the one or more location parameters indicative of the geographic point of interest. The application programming interface includes instructions for requesting, by the first software application, location data associated with a geographic point of interest from a geographic data system based at least in part on the query string that includes the one or more location parameters. The location data is determined based at least in part on a prioritization of the one or more location parameters. The one or more computing devices provide for display the location data associated with the geographic point of interest.

One example aspect of the present disclosure is directed to a computing device including a display device, one or more processors, and one or more memory devices. The one or more memory devices store computer-readable instructions that implement an application programming interface invoked by a software application to obtain location data to provide as part of the software application. The instructions include generating, by a first software application, a query string that includes one or more location parameters indicative of the geographic point of interest. The instructions include requesting, by the first software application, location data associated with a geographic point of interest from a geographic data system based at least in part on the query string that includes the one or more location parameters. The one or more processors are configured to provide for display location data associated with the geographic point of interest via the display device, the location data being determined based at least in part on a prioritization of the one or more location parameters.

One example aspect of the present disclosure is directed to a computer-implemented method of obtaining geographic location data. The method includes identifying, by the first software application running on one or more computing devices, one or more location parameters indicative of a geographic point of interest based at least in part on an application programming interface invoked by the first software application. The method includes generating, by the first software application running on the one or more computing devices, a query string including the one or more location parameters indicative of the geographic point of interest. The method includes requesting, by the first software application running on the one or more computing devices, location data associated with the geographic point of interest based at least in part on the query string including the one or more location parameters indicative of the geographic point of interest. A geographic data system determines the location data based at least in part on a prioritization of the one or more location parameters. The method includes providing for display, on at least one display device, the location data associated with the geographic point of interest.

Other example aspects of the present disclosure are directed to computer-implemented methods, systems, apparatus, tangible, non-transitory computer-readable media, user interfaces, memory devices, and electronic devices for obtaining geographic location data.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
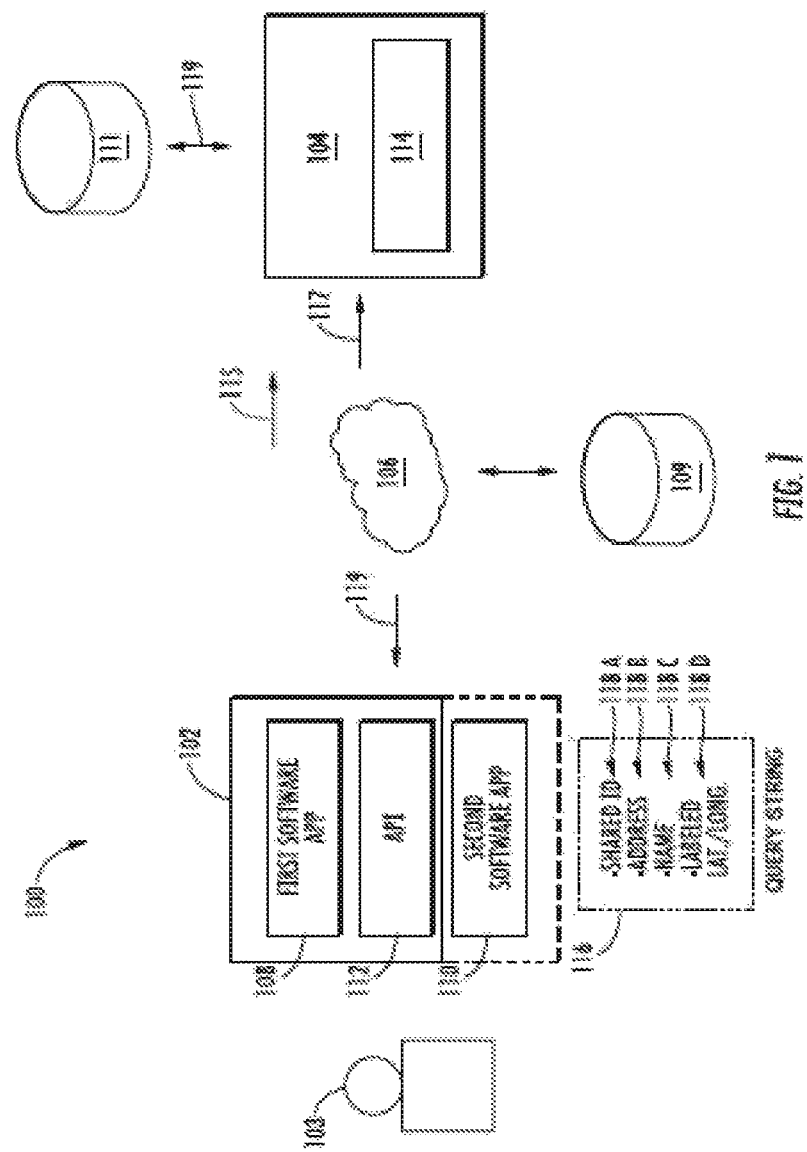
FIG. 1 depicts an overview of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to application programming interfaces ("APIs") for a software application implemented on a user computing device to stably and consistently obtain geographic location data. The software application can be, for example, a web-based software application implemented in a browser, a locally-stored software application, and/or another application. More particularly, the APIs can allow a software application to obtain location data associated with a geographic point of interest from a heterogeneous data set (e.g., a data set that is separate and distinct from a data set associated with that software application). For instance, a user computing device can include a first software application associated with a first entity (e.g., a restaurant review service provider) and a second software application associated with a second entity (e.g., a geographic mapping service provider), that is separate relative to the first entity. The first software application (e.g., providing restaurant reviews/listings) may lack the capabilities and/or data associated with the second software application (e.g., geographic map information, navigation data). For example, the first software application (e.g., restaurant review application) may not have the data and/or capability to provide a user with directions to a restaurant. Thus, the first software application executed on the user computing device can request location data (e.g., navigation data) from a geographic data system (e.g., including a geographic mapping database) associated with the second software application.

The API can define one or more location parameter(s) that the first software application can provide to, for example, invoke the mapping services of the second software application. By way of example, a user may identify a restaurant of interest in the first software application and interact with a user interface element (e.g., a soft button) to obtain the location and/or directions to the restaurant. The first software application of the restaurant review service can call the API to identify one or more location parameter(s) to provide to geographic data system and/or the second software application of the geographic mapping service provider. The geographic data system (and/or the second software application) can provide the location and/or directions to the restaurant. The location parameter(s) can include, for example, a deep link indicative of the restaurant name, address, etc. The geographic data system can use the location parameter(s) to obtain location data (e.g., location on map, navigation data, operations hours) associated with the restaurant from its associated database, as further described herein. In some implementations, the second software application can be configured to provide the location data to a user (e.g., through a graphical user interface component or through audio and/or vibratory cues). In this way, the API can provide a common format for the first software application to provide stable deep links to obtain location data associated with a geographic point of interest. This can improve the stability and consistency of communications between the applications and a geographic data system that is associated with such data. Furthermore, this can increase the likelihood that the requested location data associated with the geographic point of interest is accurately found and provided for a user.

More particularly, a user device can include at least a first software application and one or more API(s). The first software application can be associated with an entity that desires to provide users of the first software application with location data associated with a geographic point of interest. For instance, the first software application can be a consumer review application, a social media application, an entity (e.g., hotel) finder application, a trip planning application, a shipping/delivery application, and/or other end use applications. By way of example, the first software application can be directed to providing consumer reviews of restaurants. A user of the first software application may desire to know the location on a map and/or directions to a particular restaurant, and thus select the restaurant as a geographic point of interest. The first software application can be associated with a set of data that is accessible by the first software application. However, this data may be insufficient, inappropriate, or unusable for providing the desired restaurant location data to the user. As such, in some implementation, the first software application can request location data from a geographic data system, which can be associated with a geographic mapping service for providing geographic map information to a user, such as, for example, GoogleMaps®. In some implementations, the first software application can invoke a second software application, which can also be associated with the geographic mapping service. The second software application can be operated on the user device and/or on a device remote from the user device (e.g., as a web-based application). The first software application can request that the second software application obtain location data (e.g., via the geographic data system) and provide location data (e.g., via a user interface).

In order to accurately format its request for the location data associated with the geographic point of interest (e.g., the restaurant) the first software application can call one or more API(s). The API(s) can include instructions identifying the type of information the first software application should provide to the geographic data system and/or the second software application in order for correct location data to be provided to the user. The API can include instructions for providing one or more location parameter(s) to the second software application. The location parameter(s) can be included in, for example, a query string, a link (e.g., deep link), etc. The location parameter(s) can include one or more place identifier(s) and/or a labeled latitude-longitude identifier. The place identifier(s) can include a shared identifier associated with the restaurant (e.g., a specific reference used in the database associated with the geographic data system for the restaurant), an address (e.g., 926 Cleveland St. City A, State A), and/or a name associated with the restaurant (e.g., Hudson's Cafe). The labeled latitude-longitude identifier can include a latitude-longitude coordinate pair associated with the restaurant and one or more descriptor(s) associated with the restaurant (e.g., Hudson's, restaurant, eatery, café). The first software application can provide a query string included the one or more location parameter(s) indicative of the geographic point of interest (e.g., restaurant) to the geographic data system.

Additionally, and/or alternatively, the first software application can provide the query string to the geographic data system via the second software application. The location parameter(s) can be provided by the second software application to the geographic data system along with instructions specifying one or more action(s) to be performed by the geographic data system.

The geographic data system can determine location data based at least in part a prioritization of the one or more location parameter(s). For instance, the second software application, the geographic data system, and/or another component can parse the location parameters (e.g., provided in the query string). In some implementations, the API can provide instructions for parsing the location parameter(s). As will be further described, the location parameter(s) can first be parsed for a place identifier (e.g., shared identifier, address, name) for the geographic point of interest (e.g., restaurant), and then for a labeled latitude-longitude identifier. The geographic data system can assign a higher priority to a place identifier than a labeled latitude-longitude identifier because, in some cases, the place identifier may return more accurate location data than a labeled latitude-longitude identifier. Once the location parameter(s) have been parsed to identify the information included therein, the location data for the geographic point of interest can be obtained (e.g., from a database of the geographic mapping service provider).

The location data can include a location of the geographic point of interest on a map user interface, routing information, such as one or more travel route(s) to the geographic point of interest, an estimated time and/or distance remaining to an arrival by the user at the geographic point of interest ("ETD information"), one or more navigation instruction(s) (e.g. next navigation action instructions, an estimated time and/or distance remaining to the next navigation action, etc.), hours of operation associated with the geographic point of interest, traffic data associated with the geographic point of interest, hours of busy operation (e.g., crowded, popular), and/or other suitable data. In some implementations, the location data can include a visual representation of the one or more travel route(s), such as map data for presentation in conjunction with the route(s) and/or other information.

The geographic data system can provide the location data for display to the user. For example, the location data can be received by the second software application and displayed for the user. In some implementation, the second software application can launch and display a user interface in the foreground of the user device that provides the location data associated with the restaurant for the user. In some implementations, the first software application can present at least a portion of the location data within a user interface of the first software application.

In this manner, according to particular aspects of the present disclosure, the API can include sets of computer-readable instructions that when executed by one or more processor(s) facilitate use of a geographic data service with a developer's software application. The sets of instructions, when implemented by one or more processor(s), can govern interaction by the software application with the geographic data system via the API as well as the display and/or delivery of location data to the user. Example instructions associated with an API that are facing a developer of a software application can include instructions specifying one or more parameter(s) that govern how the location data is retrieved by a geographic data system and/or an invocation of a second software application.

In this way, the API according to example embodiments of the present disclosure can have a technical effect of allowing a first software application to leverage the geographic data services provided by another entity (e.g., an entity associated with the second software application). The API can allow for the customization of the geographic data services for various end use needs, such as for ride sharing applications, shipping/delivery applications, social applications, and other end use applications.

The APIs, systems, and methods provided herein provide an improvement to user device computer technology and geographic data system computing technology by enabling more accurate communication from software applications via an API that includes instructions for identifying one or more location parameters indicative of a geographic point of interest, generating a query string that comprises the one or more location parameters indicative of the geographic point of interest, requesting location data associated with a geographic point of interest from a geographic data system based at least in part on the query string, where the geographic data system determines the location data based at least in part on a prioritization of the one or more location parameters, and where the location data is provided for display. The API can provide, for example, a common format for requesting location data from the geographic data system. As such, the API can allow a software application associated with a first data set to more accurately request and retrieve data from a geographic data system and/or another software application associated with a different, second data set. Accordingly, by implementing the API, the user device can provide an improved user experience with more accurate location data for geographic points of interest. Moreover, the APIs, systems, and methods can decrease processing and response time for displaying location data when a user selects a geographic point of interest by using commonly formatted location parameters that will increase efficiency of data searching, retrieval, and acquisition.

With reference now to the figures, example aspects of the present disclosure will be disclosed in greater detail. For instance, FIG. 1 depicts an overview of an example system 100 for obtaining geographic location data according to example embodiments of the present disclosure. The system 100 can include one or more computing device(s) 102 that can send and receive data from a geographic data system 104 (e.g., associated with a geographic mapping service provider) via a communication network 106. The network 106 can be any type of communications network, such as a local area network (e.g. intranet), wide area network (e.g. Internet), cellular network, or some combination thereof. The network 106 can also include a direct connection. In general, communication can be carried via network 106 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The computing device(s) 102 can be, for instance, a user device, a smartphone, tablet, wearable device, laptop, desktop, mobile device, device capable of being carried by a user while in operation, display with one or more processors, vehicle system, or other user device. The computing device(s) 102 can be used and/or associated with a user 103. The computing device(s) 102 can include one or more processor(s) and one or more memory device(s) for implementing the functions and operations described herein.

The geographic data system 104 can include one or more computing device(s) 114 such as server(s) (e.g., web servers). The computing device(s) 114 can perform the functions and operations of the geographic data system 104 described herein. For example, the computing device(s) 114 can include one or more processor(s) and one or more memory device(s). The one or more memory device(s) can store computer-readable instructions for implementing the functions and operations (e.g., by the processors), as described herein. The geographic data system 104 can be remote from the computing device(s) 102 associated with the user 103.

A first software application 108 can be implemented on the computing device(s) 102. A second software application 110 can be implemented on the computing device(s) 102 and/or on one or more computing device(s) that are remote from the computing device(s) 102. The software applications 108, 110 can be stored locally on the computing device(s) 102 and/or can be, for instance, web applications accessed via a web browser implemented on the computing device(s) 102. The software applications 108, 110 can be developed by separate entities. For instance, the first software application 108 can be developed by a third party entity that is independent of and/or not affiliated with an entity associated the second software application 110. The second application 110 can be associated with, for example, the geographic mapping service provider associated with the geographic data system 104.

The first and second software applications 108, 110 can be associated with different services, products, functions, etc. for an end user. For example, the first software application 108 can be a consumer review application, a social media application, an entity (e.g., hotel) finder application, a trip planning application, a shipping/delivery application, a ride share application, and/or other end use applications. The first software application 108 can be associated with a first entity that desires to provide users of the first software application 108 with location data associated with a geographic point of interest. By way of example, the first software application 108 can be directed to providing consumer reviews of restaurants and desire to provide users with location data associated with a particular restaurant. The second software application 110 can be associated with a second entity, such as a geographic mapping service provider (e.g., associated with system 104). The second software application 110 can be associated with a geographic mapping service for providing geographic map information to a user, such as, for example, GoogleMaps®.

The first software application 108 can be associated with a separate, heterogeneous data set than the second software application 110 (and/or the geographic data system 104). For instance, the first software application 108 can be associated with a first set of accessible data 109 (e.g., location data) and the second software application 110 can be associated with a second set of accessible data 111 (e.g., location data) that is different from the first set of data 109. The sets of data may be stored in separate databases and/or other memory devices. By way of example, the first software application 110 can be directed to providing consumer reviews of restaurants. A user 103 of the first software application 108 may desire to know the location on a map and/or directions to a particular restaurant, and thus select the restaurant as a geographic point of interest. The first software application 108 can be associated with the first set of location data 109 that is accessible by the first software application 108 (e.g., via a communications network). In some implementations, the first set of location data 109 may be insufficient, inappropriate, and/or unusable for providing the desired restaurant location data to the user. For instance, this data may be descriptive of an address of the restaurant but insufficient to provide directions to the restaurant or pinpoint that address on a geographic map user interface. As such, the first software application 108 can request data associated with a geographic point of interest from the geographic data system 104. To do so, the first software application 108 can call a navigation API 112, as will be further described herein. In this manner, the API 112 can be used by the first software application 108 to obtain location data from the geographic data system 104 (e.g., via the communication network 106).

Example aspects of the present disclosure are discussed with accessing data from a remote geographic data system 104 for purposes of illustration and discussion. Those of ordinary skill in the art, using the disclosures provided herein, will understand that the API 112 can be used to access data from other sources, such as local sources or applications located on the user device 102.

The second software application 110 can be configured to present location data to the user 103 in real time and/or near real time (e.g., as a user or vehicle carrying the computing device(s) 102 traverses along a route from an origin to one or more destinations). In some implementations, the second software application 110 can include a user interface component for presenting the location data to the user 103 via one or more display device(s). Additionally, and/or alternatively, the second software application 110 can provide audio guidance or other notifications (e.g., vibratory notifications) to the user indicative of location data (e.g., turn-by-turn directions).

In some implementations, the API 112 can facilitate an invocation of the second software application 110 by the first software application 108. The invocation of the second software application 110 (by the first software application 108) can cause the second software application 110 to run on the computing device(s) 102.

In some implementations, the invocation of the second software application 110 (by the first software application 108) can further cause the second software application 110 to be displayed by the one or more computing device(s) 102. For example, the invocation can cause the second software application 110 to be brought to the foreground of a user interface of the computing device(s) 102, such that the user 103 can view and/or interact with the second software application 110. For instance, if the second software application 110 is not currently running on the computing device(s) 102, the second software application 110 can be launched and brought to the foreground of the user interface responsive to the invocation. If the second software application 110 is currently running on the computing device(s) 102, the second software application 110 can be brought to the foreground of the user interface responsive to the invocation.

Figure 2:
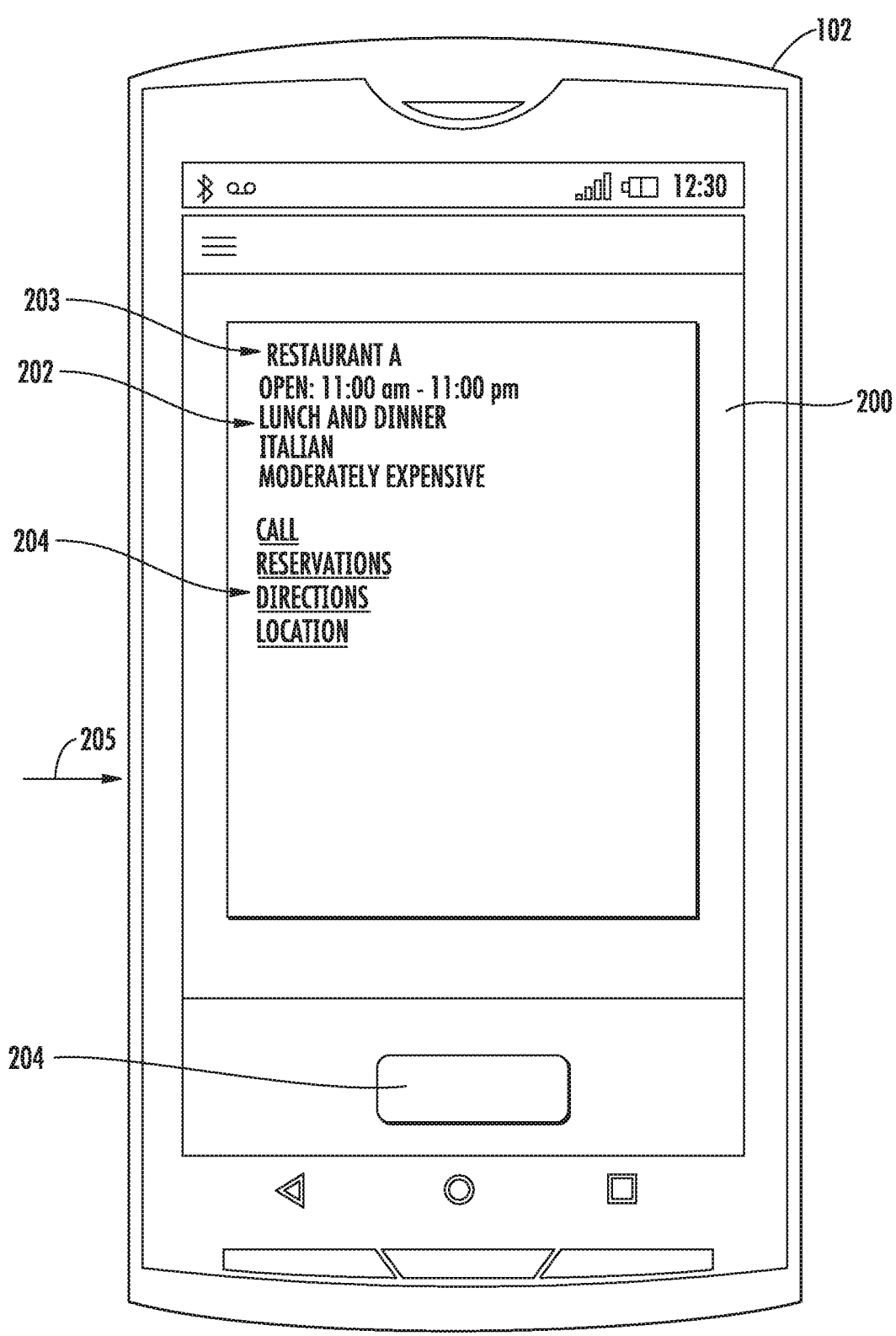
FIGS. 2 and 3 depict example graphical user interfaces associated with software applications according to example embodiments of the present disclosure.

In some implementations, the invocation can occur responsive to a user interaction with a linking element displayed within a user interface of the first software application 108. For instance, FIG. 2 depicts an example graphical user interface 200 associated with the first software application 108 according to example embodiments of the present disclosure. The user interface 200 can be displayed via a display device of the computing device(s) 102 (e.g., a user device). The user interface 200 can include a plurality of interface elements 202 that provide information associated with the first software application 108 and/or a geographic point of interest 203, such as, for example, "Restaurant A".

The user interface 200 can include one or more linking element(s) 204 configured to link and/or otherwise connect the first software application 108 and the second software application 110. As indicated, the linking element 204 can be a selectable interface element (e.g., hyperlink, soft button) capable of receiving an input by the user. The first software application 108 (e.g., running on the computing device(s) 102) can receive data 205 indicative of a user interaction with a linking element 204 displayed within a user interface 200 of the first software application 108. Invoking of the second software application 110 can be performed responsive to receiving the data 205 indicative of the user interaction with the linking element 204. Upon a user interaction with linking element 204, the second software application 110 can be launched on the user device 102 and/or brought to the foreground of the user interface of the user device 102.

Returning to FIG. 1, the API 112 can provide an interface between the first software application 108, the second software application 110, and/or the geographic data system 104. For instance, the API 112 can include instructions 116 for requesting location data associated with a geographic point of interest from a geographic data system 104. The API 112 can be hosted on the computing device(s) 102 and/or remote from the computing device(s) 102. The API 112 can include a common format for requesting location data from the geographic data system 104 such that the computing device(s) 114 of the system 104 have a better opportunity to find and provide data from its associated data set (e.g., 111), which is heterogeneous from a data set (e.g., 111) associated with the first software application 108.

The first software application 108 can request location data, such as a map identifying the location of a geographic point of interest 203 (e.g., Restaurant A) and/or directions to the geographic point of interest 203. To facilitate such a request, the API 112 can include instructions 116 for identifying, by the first software application, one or more location parameters 118A-D indicative of a geographic point of interest. The API 112 can also include instructions 116 for generating, by the first software application 108, a query string that comprises one or more location parameter(s) 118A-D indicative of the geographic point of interest. The location parameter(s) 118A-D can include one or more place identifier(s) 118A-C and/or a labeled latitude-longitude identifier 118D.

The place identifier(s) 118A-C can include a shared identifier 118A (e.g., if it exists), an address 118B (e.g., 926 Cleveland St. City A, State A, zip code, etc.) associated with the geographic point of interest 203 (e.g., Restaurant A) and/or a name 118C (e.g., "Hudson's Café") associated with the geographic point of interest 203. The shared identifier 118A can be included in the event that the first software application 108 (and/or its associated entity) uses the same location data (and/or can access the common identifiers) as the graphic data system 104 (and/or its associated entity). This can arise, for example, in the event that the entity associated with the graphic data system 104 and/or the second software application 110 has granted the entity associated with the first software application 108 permission to use its location data. The shared identifier 118A can be a specific reference (e.g., letters, numbers, symbols, combination thereof) that matches one or more reference in the data set 111 associated with the graphic data system 104 and/or the second software application 110. However, in the event that the first software application 108 and the second software application 110 rely on heterogeneous data sets (and/or do not share data), it may be unlikely for the location parameters to include a shared identifier 118A. Thus, an address 118B and/or a name 118C associated with the geographic point of interest 203 can also, and/or alternatively, be provided.

The labeled latitude-longitude identifier 118D can include a latitude-longitude coordinate pair associated with the geographic point of interest 203 and one or more descriptor(s) associated with the geographic point of interest 203. The descriptor(s) can include text and one or more phrase(s) that are associated with the geographic point of interest, such as a nickname, a genre, a type, etc. for the particular point of interest. For example, in the event that the user 103 is attempting to find the location "Treasure Island," the latitude-longitude identifier 118C can include 125.4211 latitude, −54.2142 longitude, and the descriptor "Treasure+ Island".

The API 112 can include instructions for requesting (e.g., by the first software application 108) location data associated with a geographic point of interest 203 from the geographic data system 104. For instance, in some implementations, the first software application 108 can send data 115 to the geographic data system 104 requesting location data. The data 115 can be indicative of the query string that includes the one or more location parameters 118A-D. As will be further described herein with reference to FIG. 7, the geographic data system 104 can determine the location data associated with the geographic point of interest 203 based, at least in part, on a prioritization of the one or more location parameters 118A-D indicative of the geographic point of interest 203.

In some implementations, the first software application 108 can request location data via the second software application 110. The API 112 can include instructions for invoking the second software application 110 by the first software application. The invocation of the second software application 110 can cause the second software application 110 (e.g., a geographic mapping software application) to run on the one or more computing device(s) 102.

Moreover, the API 112 can include instructions for controlling, by the first software application 108, an interaction of the second software application 110 with the geographic data system 104 based, at least in part, on the query string that includes the one or more location parameter(s) 118A-D. For example, the first software application 108 can provide the one or more location parameter(s) 118A-D indicative of the geographic point of interest 203 (e.g., Restaurant A) to the second software application 110. For instance, the first software application 108 can provide a request to the second software application 110 to obtain location data associated with the geographic point of interest 203. The request can include the query string including the location parameter(s) 118A-D (e.g., as indicated by the API 112) and/or other data (e.g., link, deep-link, URL, etc.)

The second software application 110 can be configured to receive the request and to obtain the requested location data based, at least in part, on the one or more location parameter(s) 118A-D. For instance, the location parameter(s) 118A-D passed to the second software application 110 as part of the API 112 call can be used to automatically determine the requested location data through an interaction with the geographic data system 104. Responsive to receiving the location parameters and/or the API 112 call from the first software application 108, the second software application 110 can query the geographic data system 104 for location data associated with the API 112 call. For instance, the second software application 110 can provide data 117 indicative of the location parameter(s) 118A-D to the geographic data system 104. In some implementations, this can be accomplished by communication between the computing device(s) 102 and the server(s) 114 of the geographic data system 104 via the network 106.

The geographic data system 104 can be configured to determine the requested location data based, at least in part, on the location parameter(s) 118A-D. For example, in some implementations, the API 112 can include instructions 116 for parsing the one or more location parameter(s) 118A-D for identification of the location data associated with the geographic point of interest 203. The location parameter(s) 118A-D can be parsed by the second software application 110 (e.g., via the computing device(s) 102) by the computing device(s) 114, and/or another computing device.

The geographic data system 104 can use the parsed location parameter(s) 118A-D to obtain the requested location data 119 from the second set of data 111. The second set of data 111 can be associated with, for example, the geographic data system 104 and can include location data that is indexed by parameters associated with geographic points of interest. This can include, for instance, shared identifiers, addresses, names, geographic coordinates, descriptors, map data, route data, geographic imagery, and/or other data. The geographic data system 104 can use the location parameter(s) 118A-D associated with a geographic point of interest 203 with the index to identify and retrieve the requested location data 119 (e.g., from the second set of data 111).

By way of example, as indicated above, in some implementations, the one or more location parameter(s) 118A-D can include at least one of an address 118B associated with the geographic point of interest (e.g., Restaurant A), a name 118C associated with the geographic point of interest, and a labeled latitude-longitude identifier 118D associated with the geographic point of interest. As will be further described herein with reference to FIG. 7, the location parameter(s) 118A-D can be used to identify the requested location data 119 based, at least in part, on a prioritization, order, hierarchy, etc. associated with the one or more location parameter(s) 118A-D (e.g., the type of parameter). In some implementations, the location data 119 associated with the geographic point of interest 203 can be identified based, at least in part, on at least one of the address 118B associated with the geographic point of interest 203 and the name 118C associated with the geographic point of interest. In some implementations, the location data 119 associated with the geographic point of interest 203 can be identified based, at least in part, on the labeled latitude-longitude identifier 118D. In this way, the first software application 108 can control an interaction of the second software application 110 with the geographic data system 104 based, at least in part, on one or more location parameter(s) (e.g., indicative of a geographic point of interest 203) provided to the second software application 110 by the first software application 108.

The geographic data system 104 can communicate with the computing device(s) 102 (e.g., via network 106) to provide the location data 119 to the second software application 110 and/or the first software application 108. The one or more computing device(s) 102 can provide for display the location data 119 associated with the geographic point of interest 203. For example, in some implementations, the second software application 110 can receive the location data 119 (e.g., from the geographic data system 104) and can provide the location data 119 to the first software application 108 (e.g., via the API 112). In some implementations, the first software application 108 can present the location data 119 within a user interface of the first software application 108. Additionally, and/or alternatively, the second software application 110 can present the location data 119 within a user interface of the second software application 110.

Figure 3:
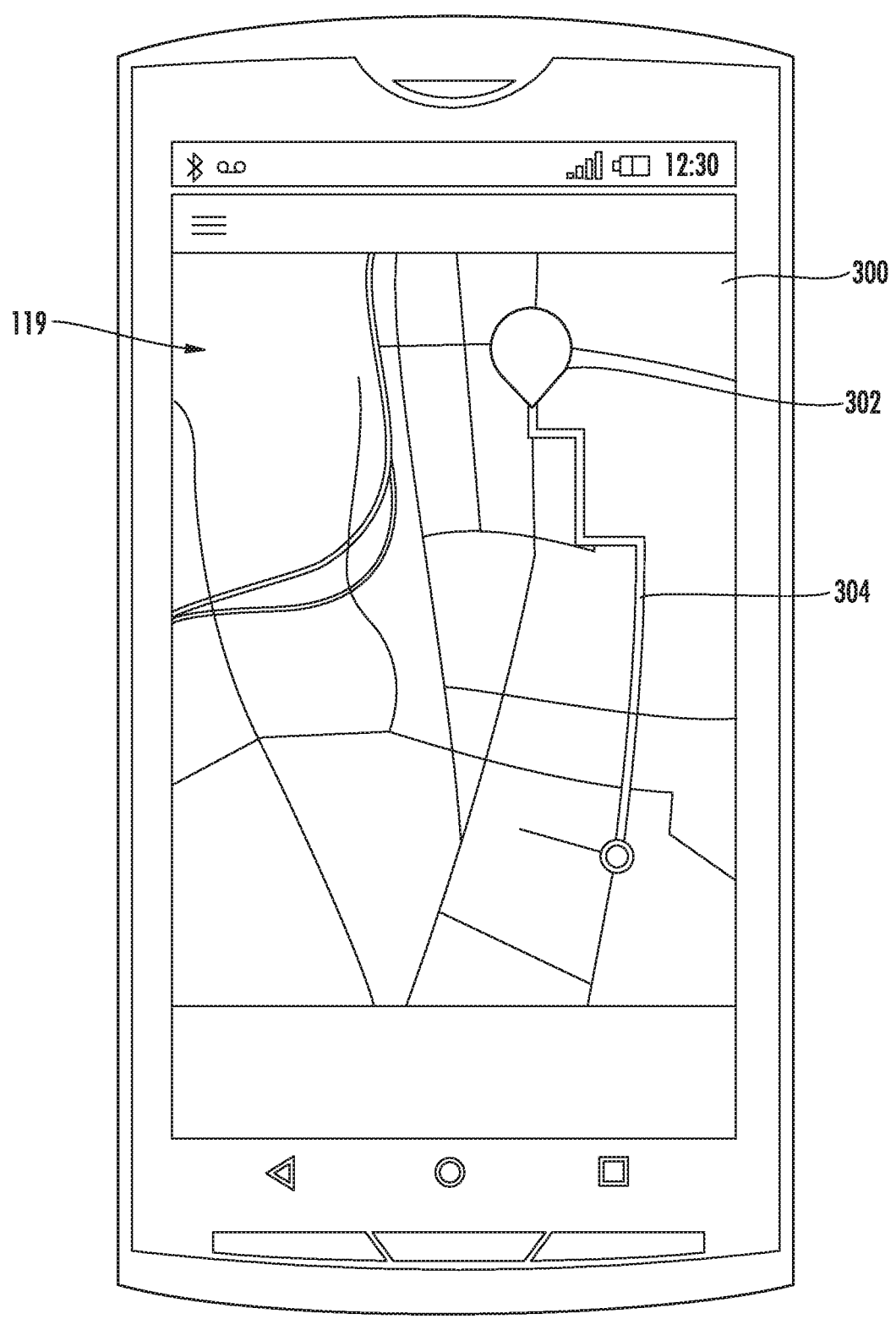

FIG. 3 depicts an example graphical user interface 300 according to example embodiments of the present disclosure. The user interface 300 can be associated with the first software application 108 and/or the second software application 110. The user interface 300 can be displayed on at least one display device of the computing device(s) 102. The computing device(s) 102 can provide the location data 119 associated with the geographic point of interest 203 for display via the user interface 300. As indicated above, the location data 119 can include a location identifier element 302 that indicates the location of the geographic point of interest 203 on a map. Additionally, and/or alternatively, the location data 119 can include navigation data associated with one or more travel route(s) 304 to the geographic point of interest 203. To help present this information to a user 103, the location data 119 can include one or more visual representation(s) of the one or more travel route(s) 304 (e.g., as shown in FIG. 3). The visual representations can be displayable on the at least one display device via a user interface 300. For example, the route(s) 304 can be displayed on a top down view of the map to provide a route overview. In this way, the first software application 108 can leverage the accessible location data of the second software application 110 to provide a function and/or service to its users that may not otherwise be available through the first software application (e.g., location services, navigation services).

It will be appreciated that the user interface 300 is intended for illustrative purposes only. In particular, it will be appreciated that the first and/or second software applications 108, 110 can have various other suitable interfaces that present suitable location data in a number of manners. For instance, the first and/or second software applications 108, 110 can include a navigation mode wherein turn-by-turn instructions associated with a route 304 is presented to the user. As another example, the first and/or second software applications 108, 110 can include an interface for presenting location data in text form (e.g., written instructions for traversing route(s) 304). As yet another example, the first and/or second software applications 108, 110 can include an interface for receiving a search query and presenting search results determined based, at least in part, on the search query.

Figure 4:
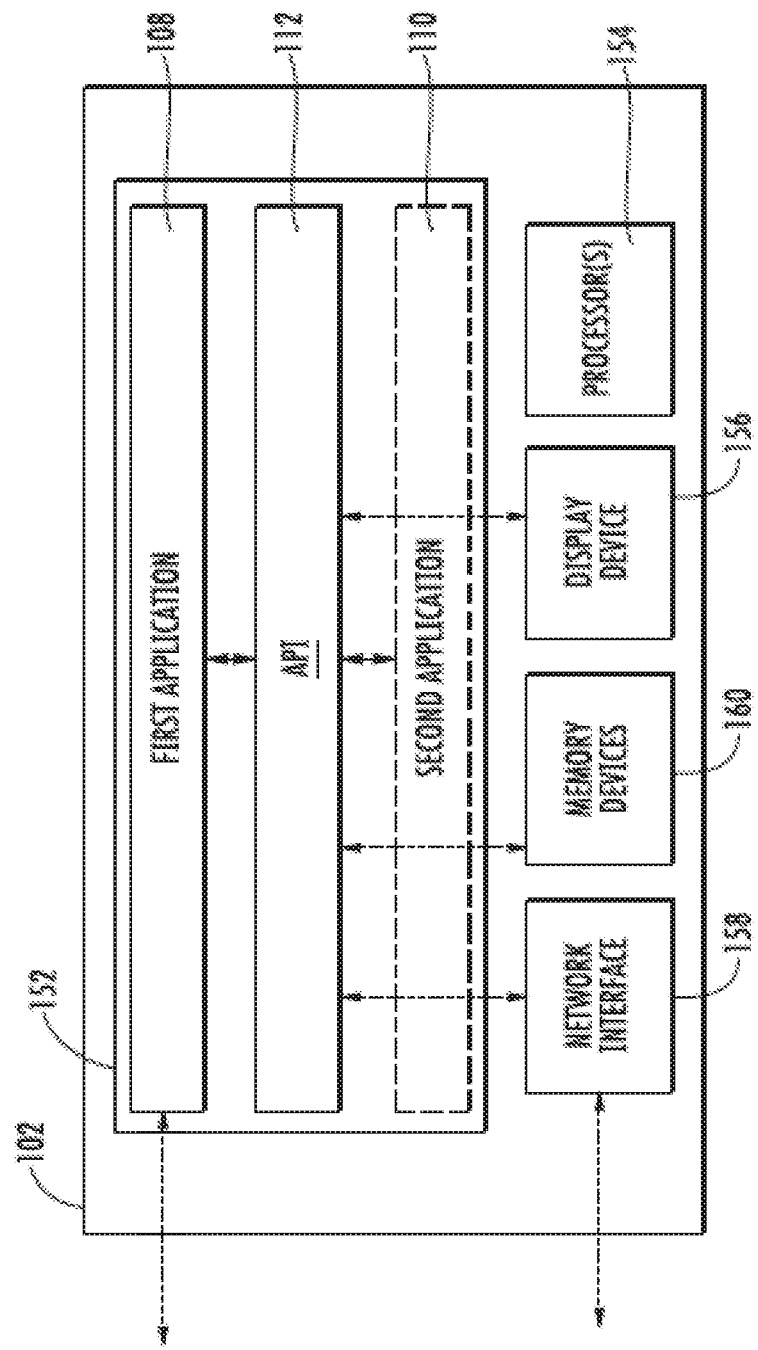
FIG. 4 depicts a block diagram of an example computing device according to example embodiments of the present disclosure.

FIG. 4 depicts an example computing device 102 configured to implement an API 112 according to example embodiments of the present disclosure. As shown, the computing device 102 includes an instruction memory 152, one or more processor(s) 154 configured to execute instructions stored in the memory 152, a display device 156, a network interface 158 that supports network communications, and one or more storage memory device(s) 160. The one or more processor(s) 154 can include any suitable processing device, such as a microprocessor, microcontroller, integrated circuit, logic device, or other suitable processing device. For clarity, the instruction memory 152 and the storage memory device(s) 160 are illustrated separately. It will be understood, however, that the components 152 and 160 can also be regions within the same memory module. More generally, the computing device 102 can include one or more additional processor(s), memory device(s), network interface(s), which may be provided separately or on a same chip or board. The components 152 and 160 can include one or more computer-readable media, including, but not limited to, non-transitory computer-readable media, RAM, ROM, hard drives, flash drives, or other memory devices.

The instruction memory 152 can store sets of instructions of an operating system (OS), an API 112, a first software application 108, and/or a second software application 110. The OS can be a mobile OS developed specifically for mobile devices. As such, the OS can include functions that allow a software application to access data such as wireless network parameters (e.g., identity of the wireless network, quality of service), as well as invoke such services as telephony, location determination (e.g., via global positioning service (GPS) or WLAN), wireless network data call origination, etc. In other implementations, the OS can be a general-purpose operating system that operates on both mobile and stationary devices, such as smartphones and desktop computers, for example. In some example implementations, the OS can include or be based upon an Android® mobile operating system developed by Google Inc. or other operating system to implement an Android operating platform. However, other suitable operating systems can be used without deviating from the scope of the present disclosure.

The software applications 108, 110 can be native applications or web-based applications. The first software application 108 can perform a call to API 112 to invoke the second software application 110, as described herein. In general, the API 112 can be made available to any suitable software application that executes on the computing device 102. Also, multiple different software applications may invoke the API 112. As described above, the second software application 110 can be downloaded and/or run on the computing device 102 and/or be downloaded and/or run on a separate computing device that is remote from the computing device 102.

In some implementations, the computing device 102 can include a positioning system. The positioning system can include one or more device(s) or circuitry for determining the position of a device. For example, the positioning system can determine actual or relative position by using a satellite navigation positioning system (e.g. a GPS system, a Galileo positioning system, the Global Navigation Satellite System (GNSS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position. The positioning system can determine a location of the computing device 102. The location can be provided to the geographic data system 104 for use by the geographic mapping system in determining location data associated with the geographic point of interest 203 (e.g., navigation from a current location to the geographic point of interest).

One or more transitory computer-readable medium can store computer-readable instructions that implement the API 112 for obtaining geographic location data executed on one or more computing device(s) 102. The API 112 can be implemented as one or several functions, a data structure, etc. Further, the API 112 may include compiled code that executes directly on the processor(s) 154 or, alternatively, instructions in any other form such as a scripting language interpreted at runtime by software applications (e.g., 108, 110). The API 112, in some example implementations, includes well-documented prototypes of several functions which a developer can include in the code of the software applications 108, 110, as well as instructions that implement these functions. In some embodiments, the API 112 can be provided to the developer as a static library.

One or more memory device(s) of the computing device 102 can store computer-readable instructions (e.g., 116) that implement the API invoked by a software application to obtain location data to provide as part of the software application. For example, such instructions can be for identifying (e.g., by the first software application 108) one or more location parameter(s) 118A-D indicative of a geographic point of interest 203. The API 112 can also include instructions for generating (e.g., by the first software application 108) a query string that comprises the one or more location parameter(s) 118A-D indicative of a geographic point of interest 203.

The API 112 can also include instructions for requesting (e.g., by the first software application 108) location data associated with a geographic point of interest 203 from a geographic data system 104 based, at least in part, on the query string that includes the one or more location parameter(s) 118A-D. For example, the API 112 can include instructions for invoking (e.g., by a first software application 108) the second software application 110. The invocation of the second software application 110 can cause the second software application 110 to run on the one or more processor(s) 154 of the computing device 102. As described herein, the second software application 110 can be a geographic mapping software application, associated with a geographic data system 104, and/or associated with a geographic mapping service.

The instructions can further include controlling (e.g., by the first software application 108), an interaction of the second software application 108 with the geographic data system 104. Such interaction can be based, at least in part, on the one or more location parameter(s) 118A-D provided to the second software application 110 by the first software application 108 (e.g., via the query string including such parameters). The location parameter(s) 118A-D are indicative of a geographic point of interest 203 (e.g., "Restaurant A"). For instance, the one or more location parameter(s) 118A-D can include a shared identifier 118A, an address 118B associated with the geographic point of interest 203, a name 118C associated with the geographic point of interest 203, and/or a labeled latitude-longitude identifier 118D associated with the geographic point of interest 203. As indicated herein, the labeled latitude-longitude identifier 118D can include a latitude-longitude coordinate pair associated with the geographic point of interest and one or more descriptor(s) associated with the geographic point of interest 203. The geographic data system 104 can determine the location data 119 based, at least in part, on a prioritization of the one or more location parameters 118A-D, as further described herein.

The one or more processor(s) 154 (of the computing device(s) 102) can be configured to provide, for display, location data 119 associated with the geographic point of interest 203 via the display device 156. The location data 119 can be determined based, at least in part, on the interaction of the second software application 110 and the geographic data system 104. For example, the location data 119 associated with the geographic point of interest 203 can be identified based, at least in part, on at least one of the address 118B associated with the geographic point of interest 203 and the name 118C associated with a geographic point of interest 203. Additionally, and/or alternatively, the location data 119 associated with the geographic point of interest 203 can be identified based, at least in part, on a radial distance centered at the latitude-longitude coordinate pair and the one or more descriptor(s) associated with the geographic point of interest, as will be further described herein.

Figure 5:
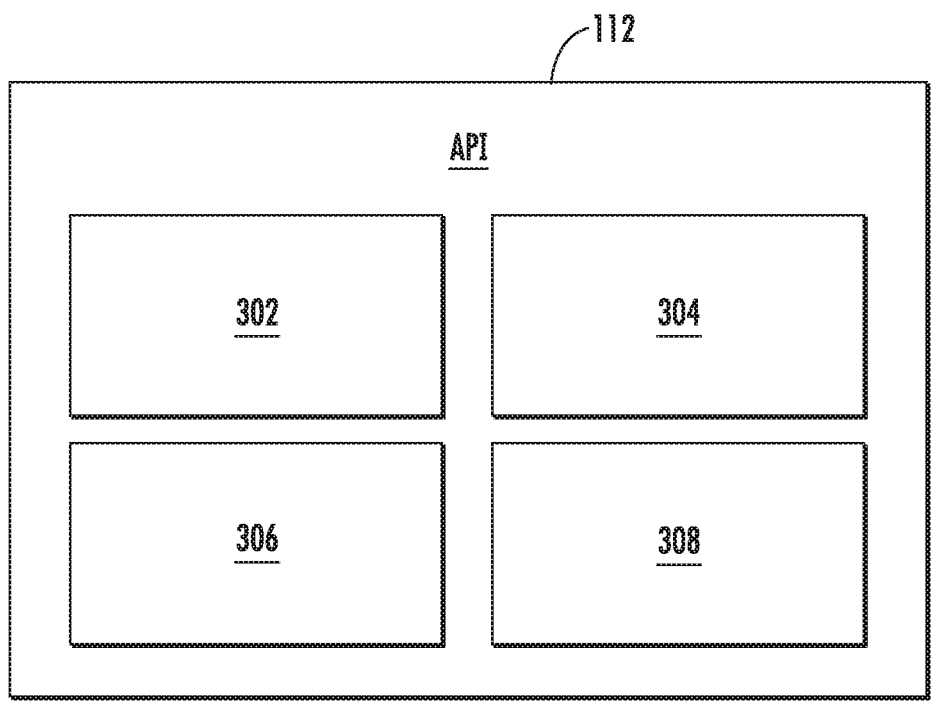
FIG. 5 depicts example implementations of an application programming interface according to example embodiment of the present disclosure.

FIG. 5 depicts a block diagram of example sets of instructions that a developer uses to configure an API 112 according to example embodiments of the present disclosure. The sets of instructions can include an initialization function 302, open session functions 304, terminate session functions 306, and various instructions 308. The instructions depicted in FIG. 5 can be used to implement the API 112 in an operating system (e.g., Android operating system). Such implementation can be based on a Messenger Object technique. In such implementation, API 112 can create an asymmetric key for the session, and send it to the second software application 110. Once an initial "handshake" is performed between the applications via the API 112, data provided by the second software application 110 (e.g. location data) can be encrypted using the asymmetric key. The first software application 108 will then be able to decrypt the data based on a one-way encryption method.

The initialization function 302 can be used to initialize the API 112 with the second software application 110, bind the API 112, and cause the second software application 110 to launch (e.g. responsive to a user interaction with the linking element). The initialization function 302 can further be used to navigate or search with the second software application 110, and to receive location data from the second software application 110.

As indicated, the initialization function 302 can be used to pass the location parameter(s) 118A-D to the second software application 110 and/or the geographic data system 104. The location parameter(s) 118A-D along with other suitable data (e.g. user location data) can be provided to the server(s) 114 for determination of suitable location data. In some implementations, the initialization function 302 can be used to open a session between the first application 108 and the second application 110. The open session can allow for communication between the first application 108 and the second application 110 via the API 112. During an open session, one or more open session function(s) 304 can be called to facilitate a determination of updated location data. Similarly, the open session functions 304 can include a new search query function. The new search query function can be used to provide a new request for location data during an open session for which new location data should be determined.

An open session can be terminated using the terminate session function 306. The terminate session function 306 can be used to terminate the connection between first application 108 and the second application 110. The API 112 can further include instructions 308 that can be used to implement various other functions. For instance, instructions 308 can include a get App version function that can be used to receive a version number of the second software application 110. It will be appreciated that instructions 308 can further include various other suitable functions.

The API 112 can define the various location parameters and their associated formats. For example, the API 112 can describe the manner in which the first software application 108 can request location data based on a variety of possible API input values, such as, for example, the following:
<shared identifier scheme>:<shared identifier value>
<query string>
<lat,lng location>(<label or query string>)
<lat,lng location>

To implement a shared identifier 118A, the "<shared identifier scheme>" input value can include a token identifying the scheme that can be used for the shared identifier. The scheme can include, for example, that as set forth by Google Places API PlaceID place_id or Plus+Code plus.code. The "<shared identifier value>" can include the actual value that identifies a particular geographic point of interest in the specified scheme. For example, the "<shared identifier value>" could identify a coffee shop located at the plus.code 4RRH45VH+5P.

The "<query string>" input value can include a free-form text query that can be interpreted by a geographically-aware search engine (e.g., with the geographic data system 104) in attempt to match based on a unique name (e.g., "Sydney Opera House") or other semi-structured identifier (such as an address string). The query string can include text that is indicative of the address 118B associated with a geographic point of interest and/or a name 118C associated with a geographic point of interest. As shown below, the character "q" can be used as a query identifier, indicating that location parameters will follow in the string.

To implement a labeled latitude-longitude identifier 118D, the "<lat,lng location>" input value can include a valid geographic coordinate (e.g., specified as latitude and longitude). This can be included with a "<query string>" input value (as described above) and/or a "<label>" input value. The "<label>" input value can include descriptor(s) such as, for example, a custom label and/or unofficial name to describe the place (e.g., "Pete's favorite picnic spot").

Additionally, and/or alternatively, the API 112 can specify the following parameters for requesting location data that includes directions:
<origin>
<destination>
<travelmode>
<avoid>

These parameters can be included in query. The "<origin>" parameter value can include a starting point for the directions. Location parameters (e.g., place search query, address search query, shared identifier, labeled latitude-longitude identifier) can be used to identify a geographic point of interest as an origin. The "<destination>" parameter value can include a destination for the directions. Location parameters (e.g., place/address search query, shared identifier, labeled latitude-longitude identifier) can be used to identify a geographic point of interest as a destination. The "<travelmode>" parameter can define a preferred method of travel (e.g., 'driving', 'walking', 'bicycling', 'transit'. The "<avoid>" parameter can indicate the preference for directions that make use of a particular travel mode to avoid certain routes (e.g., 'tolls', 'highways', 'ferries').

Additionally, and/or alternatively, the API 112 can specify the following parameter for requesting location data that includes particular waypoints:
<waypoints>

The "<waypoints>" parameter can be indicative of one or more ordered waypoint(s) to visit between the identified origin and destination (as described above). Location parameters (e.g., place/address search query, shared identifier, labeled latitude-longitude identifier) can be used to identify one or more geographic point(s) of interest as one or more waypoint(s).

The following provides example uses implementing the API. For example, for linking to a mapping application to display to the user information about the place, a software application can specify, for example:
http://www.google.com/maps/search/?q=Sydney+Opera+
House+place_id:ChIJ3S-JXmauEmsRUcIaWtf4MzE In the above example, the "http://www.google.com/maps/search/" portion can be considered the URI specifying the resource. The "?" can be a terminator that identifies the beginning of the query (and/or the end of the URI). The "q" can be a query identifier that can be interpreted to indicate that the location parameter(s) will follow. The location parameters can include: "Sydney+Opera+House+place_id: ChIJ3S-JXmauEmsRUcIaWtf4MzE" (e.g., a shared identifier).

In another example, for linking to a mapping application to display to get directions to a particular place, a software application can specify, for example:
http://www.google.com/maps/dir/?daddr=−6.168214, 39.209397(The+Magic+Truffle+Kitchen,+Zanzibar)

In the above example, the "http://www.google.com/maps/dir/" portion can be considered the URI specifying the resource. The "?" can be a terminator that identifies the beginning of the query (and/or the end of the URI). The "daddr" can be an identifier of a destination and can be interpreted to indicate that the location parameter(s) will follow. The location parameters can include: "−6.168214, 39.209397(The+Magic+Truffle+Kitchen, +Zanzibar)" (e.g., a labeled latitude-longitude identifier).

In another example, for linking to a web service to compute estimated driving time along a particular path, a software application can specify, for example:
https://maps.googleapis.com/maps/api/directions/
json?origin=origin=24+Sussex+Drive+Ottawa+
ON&waypoints=New+York,New+York+place_id:
ChIJOwg_06VPwokRYv534QaPC8g&destination=plus.
code:8645G8HM%2C+Ferris,+75125,+Texas In the above example, the "https://maps.googleapis.com/maps/api/directions/json" portion can be considered the URI specifying the resource. The "?" can be a terminator that identifies the beginning of the query (and/or the end of the URI). The "origin" can be starting point for directions with location parameters for the origin to follow (e.g., "24+Sussex+Drive+Ottawa+ON"). The "waypoints" portion can be ordered waypoints to visit between the origin and the destination and can have location parameters for the waypoints that follow (e.g., "New+York,New+York+place_id: ChIJOwg_06VPwokRYv534QaPC8g"). The "destination" portion can be a destination for directions with location parameters for the destination that follow (e.g., plus.code: 8645G8HM%2C+Ferris,+75125,+Texas).

In another example, for requesting data from a database or geographic data system using a structured query language, a software application can specify, for example:

SELECT place.contact_details.phone_number FROM global.facts
WHEREPLACE_MATCH("Little Ethel's, Balmain,
NSWplace_id:ChIJmZwHIsivEmsRqOHH433BnGc
−33.861718,151.1766301(Little Ethel Cafe)")

As shown, the above example, can include various location parameters such as a name associated with the geographic point of interest, labeled latitude-longitude identifier, etc.

Figure 6:
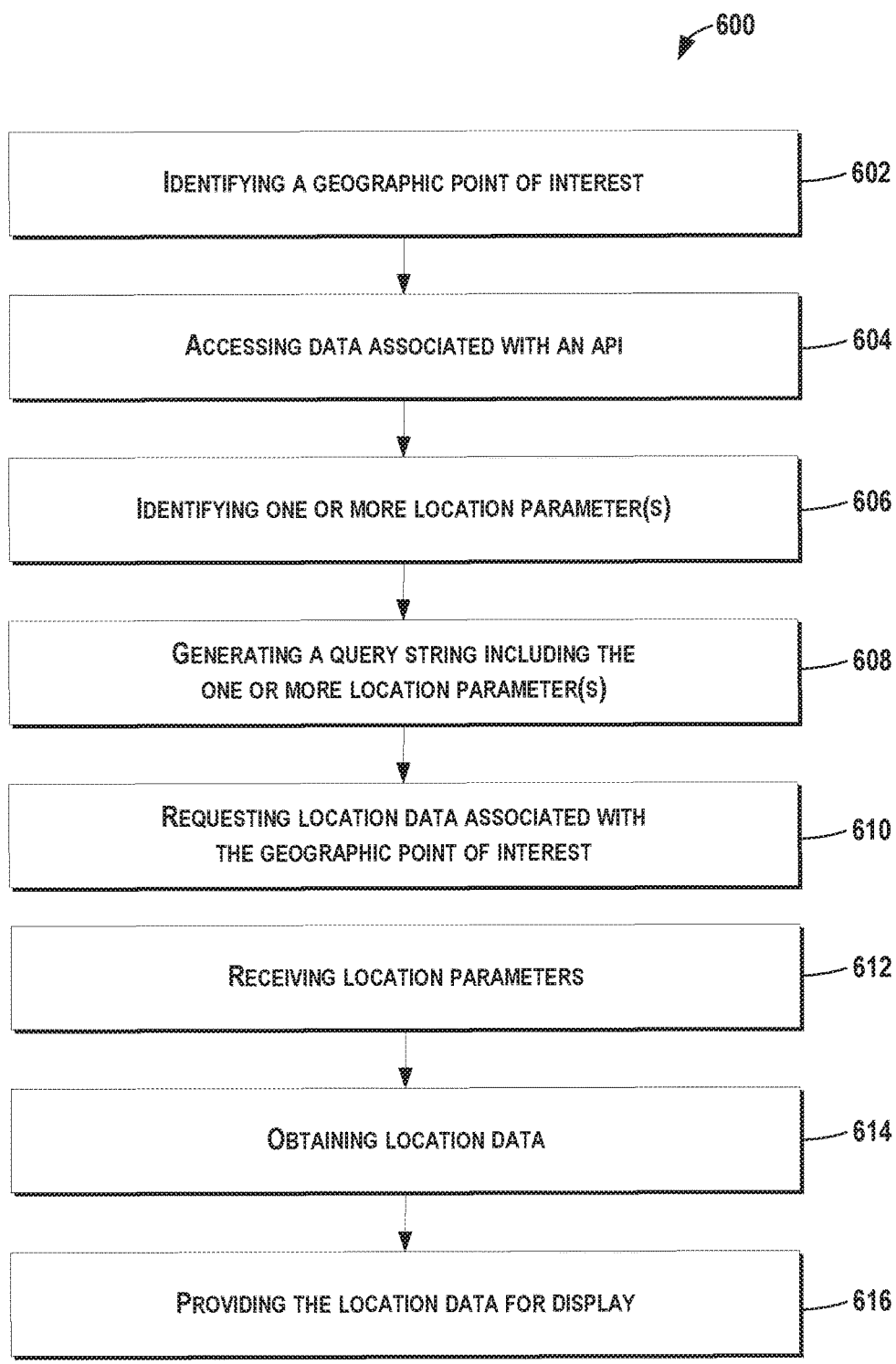
FIG. 6 depicts a flow diagram of an example method according to example embodiments of the present disclosure.

FIG. 6 depicts a flow diagram of one example method 600 of obtaining geographic location data according to example embodiments of the present disclosure. The method 600 can be implemented using, for instance, the API 112 depicted in FIGS. 1 and 5, the first software application 108, the second software application 110, the computing device(s) 102, and/or the geographic data system 104, as described herein (e.g., in FIGS. 1-5). FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At (602), the method 600 can include identifying a geographic point of interest. For instance, the first software application 108 (e.g., running on the processor(s) 154 of the computing device(s) 102) can identify a geographic point of interest 203 (e.g., Restaurant A). In some implementations, this geographic point of interest 203 can be identified based, at least in part, on a user interaction with a user interface 200 of the first software application 108. For example, the user 103 may provide a search query (e.g., "Italian restaurants in City A") via the user interface 200 and the user 103 may identify the geographic point of interest 203 (e.g., Restaurant A) based, at least in part, on the search query and/or results associated with the search query.

At (604), the method 600 can include accessing data associated with an API. For instance, the first software application 108 (e.g., running on the processor(s) 154 of the computing device(s) 102) can access data associated with the API 112. For example, data (e.g., files) associated with the API 112 can be accessed and incorporated into the first software application 108. For instance, the computing device(s) 102 can download files associated with the API 112 over a network (e.g., the Internet) and can provide the API files into a subdirectory (e.g., under a gradle root associated with the software application). Libraries associated with the API 112 and third-party dependencies can be added to the software application.

In some implementations, an access key for enabling the API 112 can be obtained. The access key can be obtained, for example, from the geographic mapping service provider. The access key can be added to the first software application 108, for instance, to a ".xml" file associated with the software application.

The developer of the API 112 can initialize the API 112. For instance, the developer can implement an initialization function. In some implementations, the developer can implement a linking element within the first software application 108. The linking element can be a selectable user interface element operable to initialize a session between the first software application 108 and the second software application 110, and to launch the second software application 110 via the API 112. For instance, the developer can configure the first software application 108 to call the API 112 initialization function(s) responsive to a user interaction with the linking element. Once the API 112 is initialized, the developer can implement the API 112 to control and configure the services of the second software application 110 and/or the geographic data system 104.

As indicated above, the API 112 can include instructions for invoking a geographic mapping service. For instance, the API 112 can specify the type, structure, syntax, etc. associated with the location parameter(s) 118A-D that the first software application 108 should provide to obtain location data 119 associated with the geographic point of interest 203. For instance, the API 112 can specify a format, syntax, etc. for a shared identifier 118A, an address 118B, a name 118C, a labeled latitude-longitude identifier 118D, etc. to be provided to the second software application 110.

At (606), the method 600 can include identifying one or more location parameter(s) indicative of a geographic point of interest. For instance, the first software application 108 (e.g., running on the processor(s) 154 of the computing device(s) 102) can identify one or more location parameter(s) 118A-D based, at least in a part on the instructions of the API 112. As described herein, the location parameter(s) 118A-D can be indicative of the geographic point of interest 203 (e.g., a geographic place, region, location of interest to and/or selected by a user).

At (608), the method 600 can include generating a query string including the one or more location parameters. For instance, the first software application 108 (e.g., running on the processor(s) 154 of the computing device(s) 102) can generate a query string including the one or more location parameter(s) 118A-D indicative of the geographic point of interest 203. The query string can be formatted using the syntax specified by the API 112, as described herein.

At (610), the method 600 can include requesting location data associated with the geographic point of interest. For instance, the first software application 108 (e.g., running on the processor(s) 154 of the computing device(s) 102) can request location data 119 associated with the geographic point of interest 203 based, at least in part, on the query string including the one or more location parameter(s) 118A-D indicative of the geographic point of interest 203. In some implementations, the first software application 108 can provide (e.g., via the computing device(s) 102) data 115 indicative of the query string to the geographic data system 104 (without going through the second software application 110).

In some implementations, the first software application 108 (e.g., running on the processor(s) 154 of the computing device(s) 102) can configure an interaction between a second software application 110 associated with the geographic mapping service and the system 104 (e.g., its computing device(s) 114) associated with the geographic mapping service. To do so, in some implementations, the first software application 108 can provide one or more location parameter(s) 118A-D to the second software application 110. The location parameter(s) 118A-D passed to the second software application 110 as part of the API 112 call can be used to automatically determine the requested location data 119 through an interaction with the geographic data system 104. In this way, the interaction (e.g., between the second software application 110 and the geographic data system 104) can be determined based, at least in part, on the one or more location parameter(s) 118A-D provided to the second software application 110 from the first software application 108.

At (610), the method 600 can include receiving the location parameter(s). For instance, in some implementations, the geographic data system 104 can receive the data 115 indicative of the query string (and/or one or more location parameters 118A-D), without the second software application 110 as an intermediary. In some implementations, the second software application 108 (e.g., running on the one or more processor(s) 154 of the computing device(s) 102) can receive data indicative of one or more location parameter(s) 118A-D (e.g., specified in the query string) from the first software application 108. As indicated above, the location parameter(s) 118A-D were identified by the first software application 108 based, at least in part, on the API 112 that includes instructions for invoking the second software application 110. Moreover, the one or more location parameter(s) 118A-D are indicative of a geographic point of interest 203. For instance, the one or more location parameter(s) 118A-C can include at least one of a shared identifier 118A, an address 118B associated with the geographic point of interest 203, a name 118C associated with the geographic point of interest 203, and a labeled latitude-longitude identifier 118D associated with the geographic point of interest 203.

The method 600 can further include parsing the data (e.g., string, query, text) indicative of location parameter(s) 118A-D to identify which location parameter(s) were provided by the first software application 108. In some implementations, the second software application 110 can parse the location parameter(s) 118A-D before sending them to the geographic data system 104. In some implementations, the geographic data system 104 can parse the location parameter(s) 118A-D after receiving them (e.g., via communication with the computing device(s) 102).

At (612), the method can include obtaining location data associated with geographic point of interest. For instance, the geographic data system 104 can determine (e.g., find, locate, retrieve, obtain) the location data 119, based at least, in part on a prioritization of the one or more location parameter(s) 118A-D, as further described below with reference to FIG. 7.

In some implementations, the second software application 110 can obtain the location data 119 associated with the geographic point of interest 203 based, at least in part, on the location parameter(s) 118A-D indicative of the geographic point of interest 203. Moreover, the method 600 can include obtaining the location data 119 from the geographic data system 104 configured to identify the location data 119 based, at least in part, on the location parameter(s) 118A-D. For example, the second software application 110 can obtain the location data 119 by providing data 117 indicative of the location parameter(s) 118A-D to the computing device(s) 114 of the geographic data system 104, such that the geographic data system 104 can obtain the location data 119 from its associated data set (e.g., 111), as further described herein with reference to FIG. 7.

At (614), the method 600 can include providing the location data for display. For instance, the location data 119 associated with the geographic point of interest 203 can be provided for display via at least one display device 156 (e.g., of a computing device 102). In some implementations, the geographic data system 104 can provide the obtained location data 119 to the computing device(s) 102 for display on a display device 156. In some implementations, the second software application 110 can provide the location data 119 for display on a user interface of the second software application 110 and/or a user interface of the first software application 108. This can allow a user 103 to view and/or interact with location data 119 associated with the geographic point of interest 203.

Figure 7:
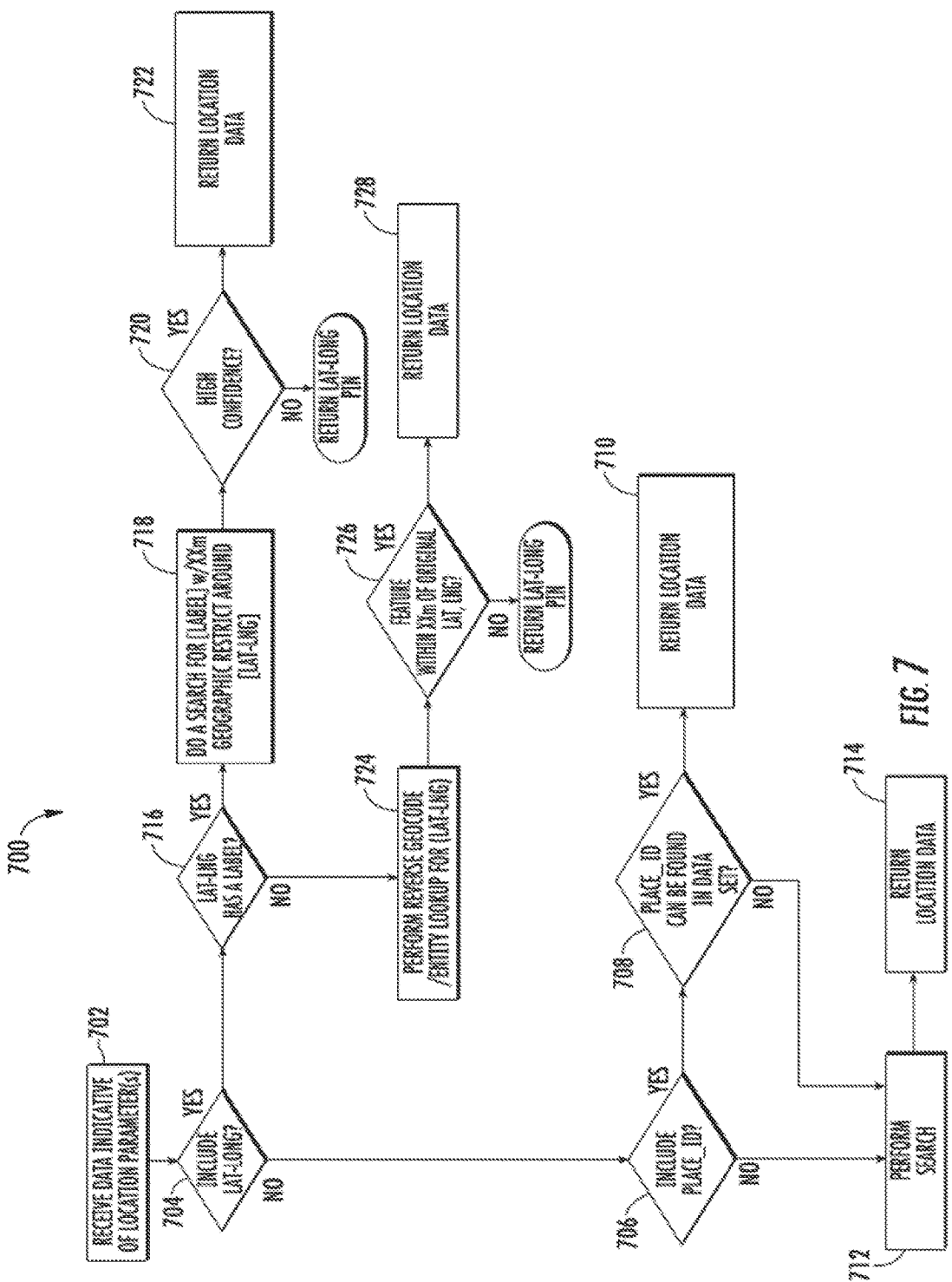
FIG. 7 depicts a flow diagram of an example method according to example embodiments of the present disclosure.

FIG. 7 depicts an example method 700 of obtaining location data according to according to example embodiments of the present disclosure. The method 700 can be implemented using, for instance, the computing device(s) 114 of the geographic data system 104, as described herein. One or more portion(s) of the method 700 can be performed within the method 600. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

FIG. 7 illustrates an example prioritization of the location parameter(s) 118A-D. For instance, in some implementations, the method 700 can be performed in a particular order to give priority to certain location parameter(s) 118A-D that may provide an opportunity to more accurately identify and retrieve the location data 119 associated with a geographic point of interest 203. For instance, the geographic data system 104 can evaluate the data 117 indicative of the location parameters in order of their respective levels of accuracy (e.g., likelihood to accurately identify a geographic point of interest 203, likelihood to accurately identify location data 119 associated with the geographic point of interest 203). For instance, a shared identifier 118A may provide the highest level of accuracy, followed by an address 118B and/or name 118C, followed by a labeled latitude-longitude identifier 118D. In some implementations, as a last resort, and as described below, the system 104 can identify location data 119 based, at least in part, on a latitude-longitude coordinate pair without a label, which may provide the lowest level of accuracy. Accordingly, in some implementations, the prioritization of the one or more location parameter(s) 118A-D can include assigning a higher priority to the shared identifier 118A for searching the location data 119 and assigning a lower priority to the labeled latitude-longitude identifier 118D for determining the location data 119. Additionally, and/or alternatively, the prioritization of the one or more location parameter(s) 118A-D can include assigning a higher priority to at least one of the address 118B associated with the geographic point of interest 203 and the name 118C associated with the geographic point of interest 203 than the labeled latitude-longitude identifier 118D for determining the location data 119. The prioritization of the location parameter(s) 118A-D can be implemented so that the geographic data system 104 can obtain the requested location data 119 by using the location parameters in the following order of priority: (1) shared identifier 118A, (2) address 118B and/or name 118C, (3) labeled latitude-longitude identifier, and (4) latitude-longitude coordinate pair.

At (702), the method can include receiving data indicative of the location parameter(s). For instance, the computing device(s) 114 of the geographic data system 104 can receive data 117 indicative of the location parameter(s) 118 (e.g., via communication with the computing device(s) 102). As indicated above, the location parameter(s) can include, for example, a shared location identifier 118A associated with the geographic point of interest 203 (e.g., Restaurant A), an address 118A associated with the geographic point of interest 203 (e.g., 926 Cleveland St. City A, State A), a name 118B (e.g., Hudson's Café) associated with the geographic point of interest 203, a labeled latitude-longitude identifier 118D (e.g., "hudsons+restaurant"), and/or other information indicative of a geographic point of interest 203.

At (704), the geographic data system 104 can determine whether the location parameter(s) 118A-D include a latitude-longitude coordinate pair. If not, at (706) the geographic data system 104 can determine whether the location parameter(s) 118A-D include a place identifier. If yes, at (708) the geographic data system 104 can determine whether the place identifier can be found in its associated data set (e.g., 111). For example, the geographic data system can first determine if the location parameters 118A-D include a shared identifier 118A and determine if the location data 119 can be located in the data set 111 based on the shared identifier 118A. If yes, at (710), the geographic data system 104 can obtain the location data 119 based, at least in part, on the shared identifier 118A. Additionally, and/or alternatively, the geographic data system 104 can determine if the location(s) parameters 118A-D include an address 118B and/or a name 118C and determine if the location data 119 can be located in the data set 111 based, at least in part, on the address 118B and/or the name 118C associated with the geographic point of interest 203. In some implementations, at (712), the geographic data system 104 can perform a search of its location data set (e.g., 111) based, at least in part, on the address 118B and/or the name 118C associated with the geographic point of interest 203. At (714), the geographic data system 104 can obtain the location data 119 based, at least in part, on the address 118B and/or the name 118C associated with the geographic point of interest 203. This can be the location data with the highest confidence level associated with the match between the location data and the information contained in the location parameter(s).

In the event that the location parameter(s) 118A-D include a latitude-longitude coordinate pair, the geographic data system 104 can, at (716), determine whether the latitude-longitude coordinate pair is a labeled latitude-longitude identifier 118D, as described herein. If yes, the geographic data system 104 can transform the data 117 (e.g., query) indicative of the labeled latitude-longitude identifier 118D into a label (e.g., including the one or more descriptor(s)) with a geographic restrict derived from the latitude-longitude coordinate pair. The geographic data system 104 can determine the location data 119 by looking for the label (e.g., descriptors) within an area defined by the geographic restrict to determine if a geographic place matches such conditions.

Figure 8:
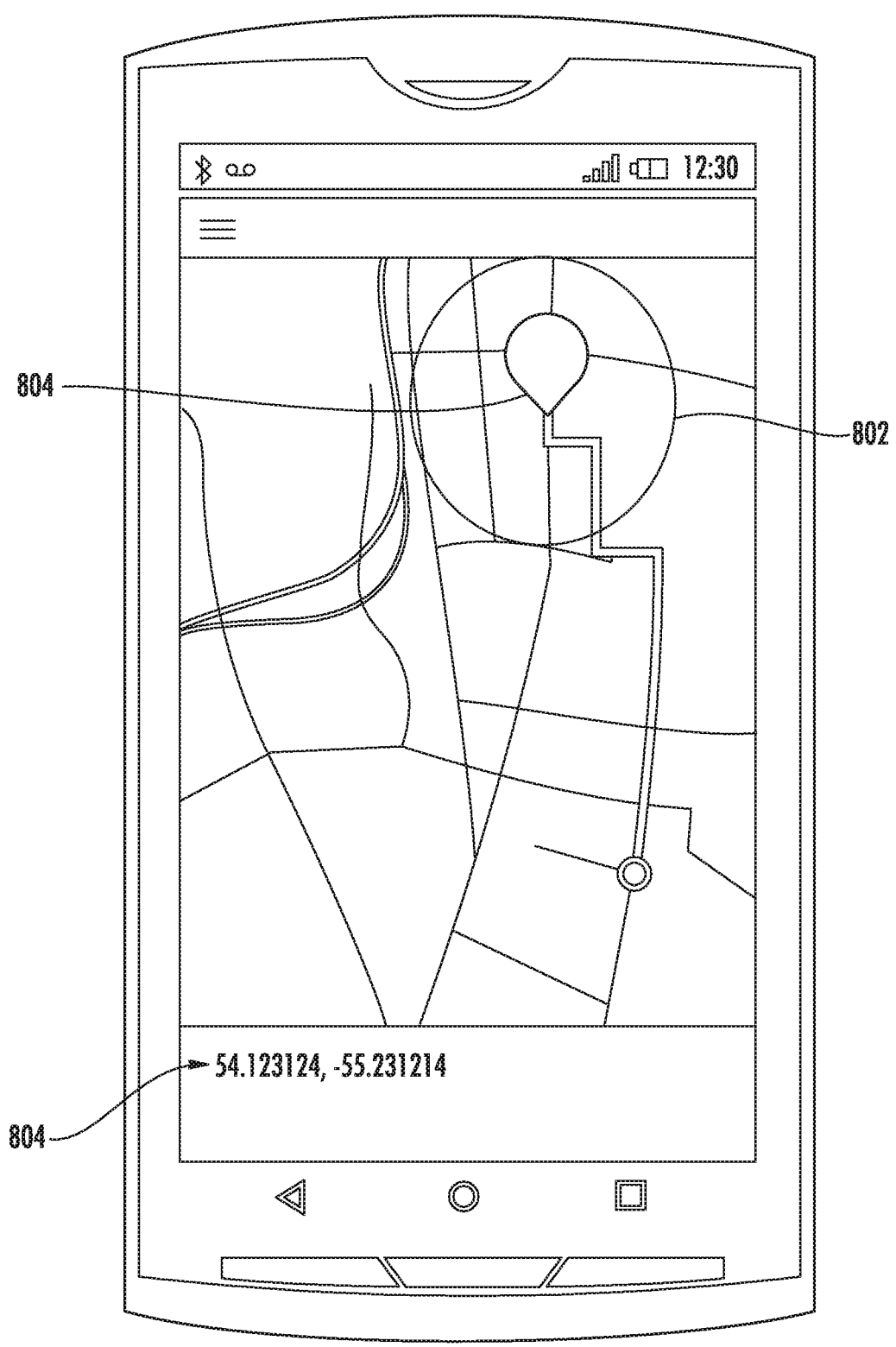
FIG. 8 depicts an example geographic restrict according to example embodiments of the present disclosure.

For instance, the location data 119 associated with the geographic point of interest 203 can be identified based, at least in part, on a radial distance centered at the latitude-longitude coordinate pair and the one or more descriptor(s) associated with the geographic point of interest 203. By way of example, as shown in FIG. 8, the geographic data system 104 can determine a radial distance 802 (e.g., 5 m, 10 m, 15 m, 20 m, 100 m, 1000 m, etc.) centered at the latitude-longitude coordinate pair 804. The geographic data system 104 can search within the area defined by the radial distance 802 to determine if any geographic places match the descriptor(s) (e.g., "Hudson's"). Returning to FIG. 7, at (720), if there is a result with a high level of confidence (e.g., of matching the descriptors and/or geographic restrict), the geographic data system 104 can obtain the location data associated with that place identified within the area defined by the radial distance 802, at (722). If the geographic data system 104 does not identify a result with a high level of confidence the retrieval of location data may stop (e.g., producing no results) or proceed to evaluate the latitude-longitude coordinate pair (e.g., as if it was not a labeled latitude-longitude identifier 118D).

At (724), in the event that the location parameter(s) includes a longitude-longitude coordinate pair that is not a labeled latitude-longitude identifier 118D (and/or in the event no results were produced by the labeled latitude-longitude identifier 118D), the geographic data system 104 can perform reverse geocoding based, at least in part, on the longitude-longitude coordinate pair (e.g., 804). For example, the geographic data system 104 can search its associated data set (e.g., 111) to identify one or more geographic place(s) that are located near the latitude-longitude coordinate pair. The geographic data system 104 can determine which of the geographic places is nearest and/or within a threshold distance (e.g., 5 m, 10 m, 15 m, 20 m, 100 m, 1000 m, etc.) of the latitude-longitude coordinate pair, at (726). If there is a geographic place within the threshold distance, the geographic data system 104 can obtain location data 119 associated with the geographic place with the threshold distance, at (728), which can be provided for display as location data 119 for the geographic point of interest 203. In this way, the system can still provide information that may be more helpful to a user than simply a latitude-longitude pin on a geographic map interface.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A non-transitory computer-readable medium storing computer-readable instructions that implement an application programming interface for obtaining geographic location data executed on one or more computing devices, the application programming interface comprising instructions for:

identifying, by a first software application associated with the one or more computing devices, a plurality of location parameters indicative of a geographic point of interest;

generating, by the first software application, a query string that comprises the location parameters indicative of the geographic point of interest, the location parameters comprising more than one of (i) a shared identifier associated with the geographic point of interest, (ii) an address associated with the geographic point of interest, (iii) a name associated with the geographic point of interest, and (iv) a latitude-longitude identifier associated with the geographic point of interest; and requesting, by the first software application, location data associated with a geographic point of interest from a geographic data system based at least in part on the query string that comprises the plurality of location parameters, wherein the location data is retrievable from the geographic data system based at least in part on a prioritization of the plurality of location parameters, and the location data is displayable via a user interface, wherein the prioritization is based at least in part on a first highest priority being associated with the shared identifier for retrieving the location data, a second highest priority being associated with at least one of the address associated with the geographic point of interest or the name associated with the geographic point of interest for retrieving the location data, and a lowest priority being associated with the labeled latitude-longitude identifier for retrieving the location data.

2. The non-transitory computer-readable medium of claim 1, wherein the instructions for requesting, by the first software application, location data associated with the geographic point of interest from the geographic data system comprise instructions for:

invoking, by the first software application, a second software application, the invocation of the second software application causing the second software application to run on the one or more computing devices, the second software application being a geographic mapping software application; and controlling, by the first software application, an interaction of the second software application with the geographic data system based at least in part on the query string, the query string being provided to the second software application by the first software application.

3. The non-transitory computer-readable medium of claim 1, wherein the location data associated with the geographic point of interest is identifiable based at least in part on the labeled latitude-longitude identifier.

4. The non-transitory computer-readable medium of claim 3, wherein the labeled latitude-longitude identifier comprises a latitude-longitude coordinate pair associated with the geographic point of interest and one or more descriptors associated with the geographic point of interest.

5. The non-transitory computer-readable medium of claim 3, wherein the location data associated with the geographic point of interest is identifiable based at least in part on a radial distance centered at the latitude-longitude coordinate pair and the one or more descriptors associated with the geographic point of interest.

6. The non-transitory computer-readable medium of claim 1, wherein the application programming interface further comprises instructions for:

parsing the plurality of location parameters for identification of the location data associated with the geographic point of interest.

7. The non-transitory computer-readable medium of claim 1, wherein the location data comprises at least one of navigation data associated with one or more travel routes to the geographic point of interest, traffic data associated with the geographic point of interest, or hours of operation associated with the geographic point of interest.

8. The non-transitory computer-readable medium of claim 7, wherein the location data comprises one or more visual representations of the one or more travel routes, wherein the visual representations are displayable on at least one display device via the user interface.

9. A computing device, comprising:
a display device;
one or more processors; and
one or more memory devices, wherein the one or more memory devices store computer-readable instructions that implement an application programming interface invoked by a software application to obtain location data to provide as part of the software application, the instructions comprising:

generating, by a first software application, a query string that comprises a plurality of location parameters indicative of a geographic point of interest, the location parameters comprising more than one of (i) a shared identifier associated with the geographic point of interest, (ii) an address associated with the geographic point of interest, (iii) a name associated with the geographic point of interest, and (iv) a latitude-longitude identifier associated with the geographic point of interest; and requesting, by the first software application, location data associated with the geographic point of interest from a geographic data system based at least in part on the query string that comprises the plurality of location parameters, wherein the location data is retrievable from the geographic data system based at least in part on a prioritization of the plurality of location parameters, wherein the prioritization is based at least in part on a first highest priority being associated with the shared identifier for retrieving the location data, a second highest priority being associated with at least one of the address associated with the geographic point of interest or the name associated with the geographic point of interest for retrieving the location data, and a lowest priority being associated with the labeled latitude-longitude identifier for retrieving the location data, wherein the one or more processors are configured to provide for display the location data associated with the geographic point of interest via the display device.

10. The computing device of claim 9, wherein the instructions for requesting, by the first software application, the location data associated with the geographic point of interest from the geographic data system comprise instructions for:

invoking, by the first software application, a second software application; and controlling, by the first software application, an interaction of the second software application with the geographic data system based at least in part on the plurality of location parameters, wherein the one or more processors are configured to provide for display the location data associated with the geographic point of interest via the display device, the location data being determined based at least in part on the interaction of the second software application and the geographic data system.

11. The computing device of claim 9, wherein the location data associated with the geographic point of interest is identifiable based at least in part on at least one of the address associated with the geographic point of interest or the name associated with the geographic point of interest.

12. The computing device of claim 9, wherein the labeled latitude-longitude identifier comprises a latitude-longitude coordinate pair associated with the geographic point of interest and one or more descriptors associated with the geographic point of interest, and wherein the location data associated with the geographic point of interest is identifiable based at least in part on a radial distance centered at the latitude-longitude coordinate pair and the one or more descriptors associated with the geographic point of interest.

13. A computer-implemented method of obtaining geographic location data, the method comprising:

identifying, by a first software application running on one or more computing devices, a plurality of location parameters indicative of a geographic point of interest based at least in part on an application programming interface invoked by the first software application;

generating, by the first software application running on the one or more computing devices, a query string comprising the plurality of location parameters indicative of the geographic point of interest, the location parameters comprising more than one of (i) a shared identifier associated with the geographic point of interest, (ii) an address associated with the geographic point of interest, (iii) a name associated with the geographic point of interest, and (iv) a latitude-longitude identifier associated with the geographic point of interest; and requesting, by the first software application running on the one or more computing devices, location data associated with the geographic point of interest based at least in part on the query string comprising the plurality of location parameters indicative of the geographic point of interest, wherein a geographic data system is configured to determine the location data based at least in part on a prioritization of the plurality of location parameters, wherein the prioritization is based at least in part on a first highest priority being associated with the shared identifier for retrieving the location data, a second highest priority being associated with at least one of the address associated with the geographic point of interest or the name associated with the geographic point of interest for retrieving the location data, and a lowest priority being associated with the labeled latitude-longitude identifier for retrieving the location data;

providing for display, on at least one display device, the location data associated with the geographic point of interest.

14. The computer-implemented method of claim 13, wherein requesting, by the first software application running on the one or more computing devices, location data associated with the geographic point of interest comprises:

providing, by the first software application running on the one or more computing devices, the query string comprising the plurality of location parameters indicative of the geographic point of interest to the geographic data system.

15. The computer-implemented method of claim 13, wherein the geographic point of interest is identifiable based at least in part on a user interaction with a user interface of the first software application.

* * * * *